(12) United States Patent
Choi

(10) Patent No.: US 10,569,639 B2
(45) Date of Patent: Feb. 25, 2020

(54) POWER TRANSMISSION SYSTEM OF HYBRID ELECTRIC VEHICLE

(71) Applicant: Hyundai Motor Company, Seoul (KR)

(72) Inventor: Kum Lim Choi, Seoul (KR)

(73) Assignee: Hyundai Motor Company, Seoul (KR)

( * ) Notice: Subject to any disclaimer, the term of this patent is extended or adjusted under 35 U.S.C. 154(b) by 656 days.

(21) Appl. No.: 15/341,990

(22) Filed: Nov. 2, 2016

(65) Prior Publication Data

US 2018/0029461 A1    Feb. 1, 2018

(30) Foreign Application Priority Data

Jul. 29, 2016  (KR) .......................... 10-2016-0097014

(51) Int. Cl.
  *B60K 6/36* (2007.10)
  *B60K 6/547* (2007.10)
  (Continued)

(52) U.S. Cl.
  CPC ............... *B60K 6/547* (2013.01); *B60K 6/36* (2013.01); *B60K 6/48* (2013.01); *F16H 3/006* (2013.01); *F16H 3/093* (2013.01); *F16H 3/12* (2013.01); *B60K 2006/4825* (2013.01); *B60Y 2200/92* (2013.01); *F16H 2003/007* (2013.01); *F16H 2003/0803* (2013.01); *F16H 2003/0931* (2013.01); *F16H 2003/0933* (2013.01); *F16H 2200/006* (2013.01);
  (Continued)

(58) Field of Classification Search
  CPC . B60K 6/36; B60K 6/48; B60K 6/547; B60K 2006/4825; F16H 3/006; F16H 3/093; F16H 3/12; F16H 2003/007; F16H 2003/0803; F16H 2003/0931; F16H 2003/0933
  USPC .......................................... 74/330, 331, 661
  See application file for complete search history.

(56) References Cited

U.S. PATENT DOCUMENTS 5,562,565 A    10/1996 Moroto et al.
6,499,370 B2 *  12/2002 Bowen .................... F16H 3/006
                                                        74/330

(Continued)

FOREIGN PATENT DOCUMENTS

JP     2011-207254 A    10/2011
KR  10-2005-0064953 A    6/2005
KR  10-2007-0021558 A    2/2007

*Primary Examiner* — William C Joyce
(74) *Attorney, Agent, or Firm* — Morgan, Lewis & Bockius LLP

(57) ABSTRACT

A power transmission system of hybrid electric vehicle may include an engine, a motor/generator, an input unit including a first input shaft, a second input shaft separately disposed on a same shaft as the first input shaft and an end portion of the second input shaft selectively connectable with the first input shaft in a state of being directly connected with the output side of the motor/generator, a first middle shaft disposed surrounding the first input shaft without rotational interference with the first input shaft to be selectively connectable with the first input shaft, and a second middle shaft including a hollow shaft and disposed surrounding the second input shaft without rotational interference with the second input shaft to be selectively connectable with the second input shaft, and an output shifter shifting torque of the input unit and outputting the shifted torque.

11 Claims, 6 Drawing Sheets

(51) Int. Cl.
  *B60K 6/48* (2007.10)
  *F16H 3/00* (2006.01)
  *F16H 3/093* (2006.01)
  *F16H 3/12* (2006.01)
  *F16H 3/08* (2006.01)

(52) U.S. Cl.
  CPC .............. *F16H 2200/0021* (2013.01); *F16H 2200/0043* (2013.01); *Y10S 903/909* (2013.01); *Y10S 903/919* (2013.01)

(56) References Cited

U.S. PATENT DOCUMENTS

| | | | | |
|---|---|---|---|---|
| 6,634,247 B2* | 10/2003 | Pels | ......................... | B60K 6/26 |
| | | | | 74/329 |
| 7,462,121 B2* | 12/2008 | Janson | ................... | B60K 6/387 |
| | | | | 475/214 |
| 8,960,033 B2* | 2/2015 | Kaltenbach | .............. | B60K 6/48 |
| | | | | 74/331 |
| 8,979,704 B2* | 3/2015 | Kaltenbach | ............ | B60K 6/387 |
| | | | | 180/65.7 |
| 10,272,764 B2* | 4/2019 | Lee | ........................ | B60K 6/365 |
| 2015/0167803 A1* | 6/2015 | Lee | ..................... | F16H 61/0403 |
| | | | | 475/5 |
| 2016/0082822 A1* | 3/2016 | Huh | ........................ | B60K 6/36 |
| | | | | 74/665 R |

* cited by examiner

POWER TRANSMISSION SYSTEM OF HYBRID ELECTRIC VEHICLE

CROSS-REFERENCE TO RELATED APPLICATION

The present application claims priority to Korean Patent Application No. 10-2016-0097014, filed Jul. 29, 2016, the entire contents of which is incorporated herein for all purposes by this reference.

BACKGROUND OF THE INVENTION

Field of the Invention

The present invention relates to a transmission system of a hybrid vehicle. More particularly, the present invention relates to a transmission system of a hybrid vehicle which may be applied to a hybrid electric vehicle so as to obtain smooth startup and quick shifting by adding a motor/generator to a structure of an automated manual transmission (AMT).

Description of Related Art

In a vehicle, environment-friendly technology is a key on which the survival of the future vehicle industry may greatly depend, so vehicle manufacturers are devoting their efforts to the development of environment-friendly vehicles so as to meet required environmental and fuel efficiency regulations. Accordingly, the automobile manufacturers have developed an electric vehicle (EV), a hybrid electric vehicle (HEV), and a fuel cell electric vehicle (FCEV) for the future vehicle technology. There are various technical limitations such as weight and cost in the future vehicles, such that the automobile manufacturers are interested in hybrid vehicles as an alternative plan of practical problems for satisfying regulations of exhaust gas and improving fuel efficiency, and are in keen competition with each other to put the vehicles to practical use.

Hybrid vehicles are vehicles using two or more energy sources (power sources) and may be implemented in various types, in which, generally, a gasoline engine or a diesel engine which generally uses fossil fuel as the power source in the related art and a motor/generator driven by electric energy are combined. The hybrid vehicles use a motor/generator with relatively high low-speed torque characteristics as a main power source at a low speed and use an engine with relatively high high-speed torque characteristics as the main power source at a high speed. Accordingly, the hybrid vehicles stops the engine using fossil fuel and uses the motor/generator in a low speed range, such that they are advantageous in improving fuel efficiency and reducing exhaust gas.

In addition, as a transmission which may be applied to such a hybrid electric vehicle, there is, for example, a double clutch transmission (DCT). The DCT is capable of increasing efficiency and improving convenience by applying two clutches to the manual transmission structure. Specifically, the DCT is a transmission wherein gear shifting is performed in such a way that odd-numbered gears and even-numbered gears are alternately operated using two clutches. The mechanism wherein the gear shifting of the odd-numbered gears and the even-numbered gears is alternately performed may improve a torque disconnection effect during the gear shifting of the existing manual transmission (MT) and the automated manual transmission (AMT).

However, the DCT may have a lot of clutch damage and energy loss due to slipping of the clutch at the time of startup. When the vehicle starts on an incline, the vehicle may have a large backward force due to the slipping of the clutch, and thus problems may occur in terms of safety. Since it needs to make shifting quick due to the heat capacity of the clutch, the impact during the gear shifting increases as compared with the automated transmission. Further, the DCT may have more researches and experiments of efficiently disposing of the motor/generator as a power source to apply to the hybrid vehicles.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a power transmission system of a hybrid vehicle which may be applied to a hybrid electric vehicle so as to obtain smooth startup and quick shifting by adding a motor/generator to a structure of an automated manual transmission.

According to various aspects of the present invention, a power transmission system of hybrid electric vehicle may include an engine, a motor/generator disposed on an opposite side of a same axis of the engine, an input unit including a first input shaft directly connected with an output side, a second input shaft separately disposed on a same shaft as the first input shaft and an end portion of the second input shaft selectively connectable with the first input shaft in a state of being directly connected with the output side of the motor/generator, a first middle shaft comprising a hollow shaft and disposed surrounding the first input shaft without rotational interference with the first input shaft to be selectively connectable with the first input shaft such that at least one input gear is disposed on an outside surface of the first middle shaft, and a second middle shaft including a hollow shaft and disposed surrounding the second input shaft without rotational interference with the second input shaft to be selectively connectable with the second input shaft such that at least one input gear is disposed on an outside surface of the second middle shaft, and an output shifter shifting torque of the input unit and outputting the shifted torque.

The motor/generator may include a rotor connected with the second input shaft and a stator disposed on an outside of the rotor and fixed to a transmission housing.

The first input shaft and the second input shaft may be selectively connectable to each other through a clutch for hybrid.

At least one input gear disposed on the first middle shaft may include a first input gear and a second input gear, the first input gear operating as an input gear of first speed and eighth speed and the second input gear operating as an input gear of second speed and fourth speed are sequentially disposed from the engine to the motor/generator, and at least one input gear disposed on the second middle shaft may include a third input gear and a fourth input gear, the third input gear operating as an input gear of the first speed and third speed and the fourth input gear operating as an input gear of fifth speed and seventh speed are sequentially disposed from the motor/generator to the engine.

The output shifter may include first and second output shafts in parallel with the first and second middle shafts, and a plurality of shifting gears disposed on the first and second output shafts in a state of being engaged with the input gears on the first and second middle shafts to be selectively and synchronously connected with the first or second output shafts by respective synchronizers.

The output shifter may include a first shifting output device including four shifting gears selectively and synchronously connected with the first shaft by selective operation of first and second synchronizers disposed on the first shaft disposed in parallel with the first and second middle shafts to output torque as four speed ratios, a second shifting output device including four shifting gears selectively and synchronously connected with the second shaft by selective operation of third and fourth synchronizers disposed on the second shaft disposed in parallel with the first and second middle shafts to output torque as four speed ratios, and a clutch for engine starting, selectively connectable with one shifting gear of the second input shaft and the shifting gear of first and second shifting output devices to deliver torque of the second input shaft to the first middle shaft.

The first synchronizer may selectively and synchronously connect a first speed shifting gear engaged with the third input gear and a fifth speed shifting gear engaged with the fourth input gear with the first output shaft.

The second synchronizer may selectively and synchronously connect a second speed shifting gear engaged with the second input gear and a sixth speed shifting gear engaged with the first input gear with the first output shaft.

The third synchronizer may selectively and synchronously connect a third speed shifting gear engaged with the third input gear and a seventh speed shifting gear engaged with the fourth input gear with the second output shaft.

The fourth synchronizer may selectively and synchronously connect a fourth speed shifting gear engaged with the second input gear and an eighth speed shifting gear engaged with the first input gear with the second output shaft.

The clutch for engine starting may selectively connect a third middle shaft with the fourth shifting gear, and the third middle shaft may be integrally formed with a passive gear for engine starting engaged with a drive gear for the engine starting including a hollow shaft and disposed on the second output shaft of one side of the fourth speed shifting gear without rotational interference to be disposed on the second input shaft.

According to various embodiments of the present invention, multi-range shifting gears are realized by torque of the motor/generator in EV mode, even-numbered shifting gears are realized by torque of the engine in HEV mode, and odd-numbered shifting gears are realized by torque of the motor/generator to improve fuel consumption.

Further, shock may be minimized according to engine starting during driving since shock generated when torque of the motor/generator is delivered to the engine through the clutch for engine starting and engine starting is conducted during driving is absorbed by slip of the second clutch. Further, gear stages for electric vehicle (EV) is separately included and brake of torque of the motor/generator during shifting of the gear stages of the engine to improve braking sensitivity during restoration braking and improve shifting sensitivity because torque assist is easy during shifting. Further, multi-range shifting which is same with conventional DCT may be completely realized by operation of the motor/generator, the clutch for hybrid, and the clutch for engine starting. And driving in EV, HEV, and restoring braking modes are possible.

It is understood that the term "vehicle" or "vehicular" or other similar terms as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuel derived from resources other than petroleum). As referred to herein, a hybrid vehicle is a vehicle that has two or more sources of power, for example, both gasoline-powered and electric-powered vehicles.

The methods and apparatuses of the present invention have other features and advantages which will be apparent from or are set forth in more detail in the accompanying drawings, which are incorporated herein, and the following Detailed Description, which together serve to explain certain principles of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention (s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 1:
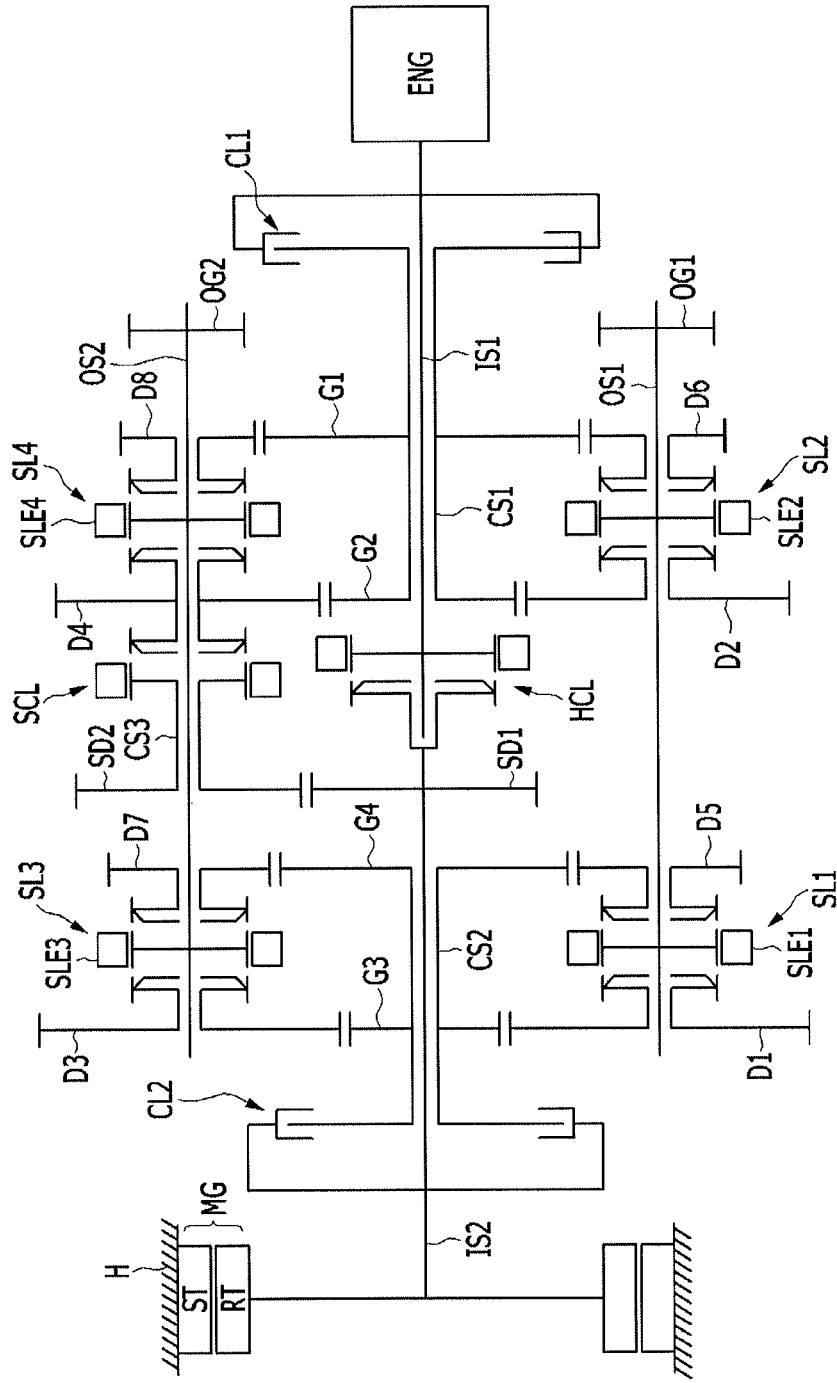
FIG. 1 is a schematic view illustrating a transmission system according to various embodiments of the present invention.

FIG. 1 is a schematic view illustrating a transmission system according to various embodiments of the present invention.

Referring to FIG. 1, a transmission system according to various embodiments of the present invention includes an engine as a power source, a motor/generator, an input unit, a output shifter, a clutch for hybrid, and a clutch for engine starting.

The engine ENG as a power source may be a various kind of typical engine using fossil fuel such as a gasoline, diesel, and liquefied gas.

The motor/generator as another power source simultaneously conducts function as a motor and generator, and the motor/generator MG includes a rotor RT which is a rotating body, and a stator fixed at a transmission housing H at an outer side of the rotor RT in a radial direction.

The engine ENG and the motor/generator MG are located in opposite sides on a same shaft.

The input unit includes first and second input shafts IS1 and IS2, and first and second middle shafts CS1 and CS2.

The first input shaft IS is a solid shaft and front end portion is directly connected with the engine ENG, the second input shaft IS2 is a solid shaft and rear end portion is directly connected with the rotor RT of the motor/generator MG to be disposed on the same shaft with the input shaft IS1 and selectively connectable with the second input shaft IS2 by clutch for hybrid HCL disposed between the first input shaft IS1 and the second input shaft IS2.

The first middle shaft CS1 includes a hollow shaft and disposed with an outside of the first input shaft IS1 without rotational interference such that front end portion is selectively connectable with the first input shaft IS1, and the second middle shaft includes a hollow shaft and disposed with an outside of the second input shaft IS2 without rotational interference such that rear end portion is selectively connectable with the second input shaft IS2.

A first and second input gears G1 and G2 are disposed from the front side to the rear side at an outside surface of the first middle shaft CS1 at regular intervals, and a third and fourth input gears G3 and G4 are disposed from the rear side to the front side at an outside surface of the second middle shaft CS2 at regular intervals.

It is explained in the above that the first, second, third, and fourth gears G1, G2, G3, and G4 are input gears of each corresponding shift steps, teeth number of gears is set so that the first input gear G1 operates for realizing a sixth and eighth speeds, the second input gear G2 operates for realizing a second and fourth speeds, the third input gear G3 operates for realizing a first and third speeds, and the fourth input gear G4 operates for realizing a fifth and seventh speeds.

That is, the first and second input gears G1 and G2 are formed for even-numbered shifting gears at the first middle shaft CS1, and the third and fourth input gears G3 and G4 are formed for odd-numbered shifting gears and reverse speed shifting gears at the second output shaft CS2.

The clutch for hybrid HCL may be selectively used a proper clutch controllable by a hydraulic control system in various kinds of power transmission apparatus such as a dry clutch, a multi-plate type hydraulic clutch, a dog clutch, and a synchronizer device. In various embodiments of the present invention, the clutch for hybrid HCL may be a synchronizer which is a kind of the dog clutch.

The first, and second middle shafts CS1 and CS2 are selectively connectable with the first clutch CL1 and the second clutch CL2 so as to receive torque through the first clutch CL1 and the second clutch CL2, respectively.

The first clutch CL1 is disposed between the first input shaft IS1 and the first middle shaft CS1 to control torque being delivered from the first input shaft IS1 to the first middle shaft CS1, and the second clutch CL2 is disposed between the second input shaft IS2 and the second middle shaft CS2 to control torque being delivered from the second input shaft IS2 to the second middle shaft CS2.

That is, the first and second clutches CL1 and CL2 may be a common hydraulic multi-plate clutch so as to be controlled by a hydraulic control system, and the first and second clutches CL1 and CL2 may be a general dry multi-plate clutch.

The output shifter being delivered torque from each input gear of the input unit to shift and output the torque includes a first and second shifting output devices OUT1 and OUT2 disposed in parallel with the first and second input shafts IS1 and IS2 at regular intervals.

The first shifting output device OUT1 includes a first output shaft OS1 disposed in parallel with the first and second input shafts IS1 and IS2 at regular intervals, a first synchronizer SL1 including a first and fifth speed shifting gears D1 and D5 and a second and sixth speed shifting gears D2 and D6 and disposed on the first output shaft OS1 and selectively and synchronously connecting the first or fifth shifting gears D1 or D5 to the first output shaft OS1, and a second synchronizer SL2 selectively and synchronously connecting the second and sixth shifting gears D2 and D6 to the first output shaft OS1.

The first speed shifting gear D1 is engaged with third input gear G3, and the fifth speed shifting gear D5 is engaged with the fourth input gear G4.

The second speed shifting gear D2 is engaged with second input gear G2, and the sixth speed shifting gear D6 is engaged with the first input gear G1.

Further, torque shifted through the first shifting output device OUT1 is delivered to a final reduction device including a conventional differential through the first output gear OG1 engaged at the front end portion or the rear end portion of the first output shaft OS1.

The second shifting output device OUT2 includes a second output shaft OS2 disposed in parallel with the first and second input shafts IS1 and IS2 at regular intervals, a third synchronizer SL3 including a third and seventh speed shifting gears D3 and D7 and a fourth and eighth speed shifting gears D4 and D8 and disposed on the second output shaft OS2 and selectively and synchronously connecting the third or seventh shifting gears D3 or D7 to the second output shaft OS2, and a fourth synchronizer SL4 selectively and synchronously connecting the fourth and eighth shifting gears D4 and D8 to the second output shaft OS2.

The third speed shifting gear D3 is engaged with third input gear G3, and the seventh speed shifting gear D7 is engaged with the fourth input gear G4.

The fourth speed shifting gear D4 is engaged with second input gear G2, and the eighth speed shifting gear D8 is engaged with the first input gear G1.

Torque shifted through the second shifting output device OUT2 is delivered to a conventional differential through the second output gear OG2 engaged at the front end portion or the rear end portion of the second output shaft OS2.

Further, a third hollow middle shaft CS3 is disposed on the second output shaft OS2 between the third synchronizer SL3 and the fourth synchronizer SL4 without rotational interference.

A passive gear for engine starting SD2 engaged with a drive gear for engine starting fixedly disposed at the second input shaft IS2 is fixedly disposed at the front side end, and the rear side end is selectively connectable with the fourth shifting gear D4 by a clutch for engine starting SCL.

Accordingly, when the clutch for engine starting is controlled, torque of the motor/generator MG is delivered the first middle shaft CS3 through the drive gear for engine starting SD1, the passive gear for engine starting SD2, the third middle shaft CS3, the clutch for engine starting SCL, and the fourth speed shifting gear D4.

The clutch for engine starting SCL may be selectively used a proper clutch controllable by a hydraulic control system in various kinds of power transmission apparatus such as a dry clutch, a multi-plate type hydraulic clutch, a dog clutch, and a synchronizer device. In various embodiments of the present invention, the clutch for engine starting SCL may be a synchronizer which is a kind of the dog clutch.

Since the first, second, third, and fourth synchronizers SL1 to SL4 are well known in the art, the configuration is not described in detail herein, and the sleeves SLE1, SLE2, SLE3 and SLE4 that are used for the first, second, third, and fourth synchronizers SL1 to SL4, respectively, has an actuator, as well known in the art, and the actuators are controlled by a transmission control unit.

Further, input gears for realizing even-numbered shifting gears are formed at the first middle shaft CS1, and input gears for realizing odd-numbered shifting gears are formed at the second middle shaft CS2 in various embodiments of the present invention. However, it is not limited to the disclosed embodiments, on the other hand, input gears for realizing odd-numbered shifting gears may be formed at the first middle shaft CS1, and input gears for realizing even-numbered shifting gears may be formed at the second middle shaft CS2

Further, the number of the input gears is not limited to four, the number may be changed according to realizing shifting gears.

Figure 2:
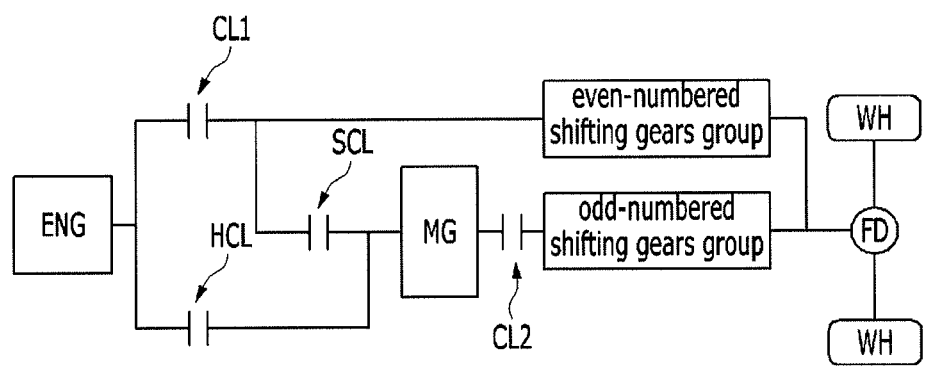
FIG. 2 is a circuit diagram of transmission system according to various embodiments of the present invention.

FIG. 2 is a circuit diagram of transmission system according to various embodiments of the present invention.

Referring to FIG. 2, in the transmission system according to various embodiments of the present invention, torque of the engine ENG as energy source is delivered to the even-numbered shifting gears group through the first clutch CL1 to be shifted, and delivered to a driving wheel WH through a final reduction device FD including a differential. Torque of the motor/generator MG as another energy source is delivered to the odd-numbered shifting gears group through the second clutch CL2 to be shifted, and delivered to a driving wheel WH through a final reduction device FD including a differential.

Further, the torque of the motor/generator MG may be delivered to the engine ENG through the clutch for engine starting SCL and the first clutch CL1, and the engine ENG and the motor/generator MG may be selectively connectable with each other through the clutch for hybrid HCL.

Figure 3:
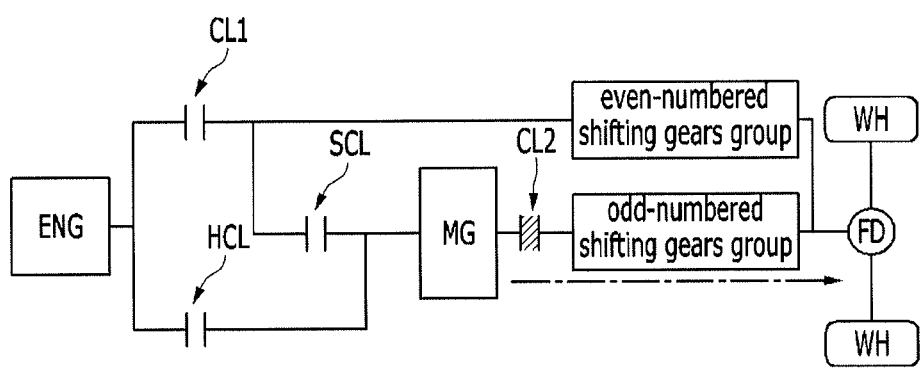
FIG. 3 is a circuit diagram in an electric vehicle (EV) mode of transmission system according to various embodiments of the present invention.

FIG. 3 is a circuit diagram in EV mode of transmission system according to various embodiments of the present invention.

Referring to FIG. 3, the transmission system according to various embodiments of the present invention, the torque of the motor/generator MG is delivered to the odd-numbered shifting gears group by the second clutch CL2 in EV mode as an alternating long and short dashed line to be shifted to the first, third, fifth, and seventh shifting gears according to driving condition and delivered to the driving wheel WH through the final reduction device FD including a differential.

Figure 4:
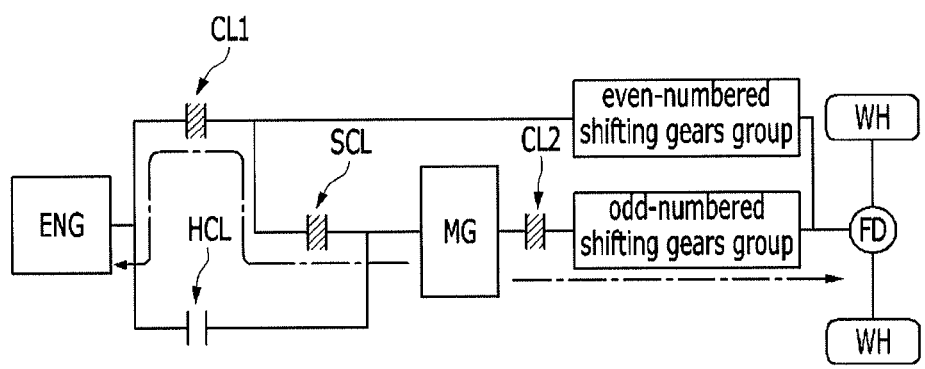
FIG. 4 is a circuit diagram in engine starting during driving of transmission system according to various embodiments of the present invention.

FIG. 4 is a circuit diagram in engine starting during driving of transmission system according to various embodiments of the present invention.

Referring to FIG. 4, in the transmission system according to various embodiments of the present invention, when engine starts during driving, a part of the torque of the motor/generator MG is delivered to EV driving as in the FIG. 3, and another part of torque is delivered to the engine ENG through the clutch for engine starting SCL and the first clutch CL1 to be used as a power for engine ENG starting.

At this time, shock generating according to engine starting may be absorbed by the second clutch CL2 delivering torque of the motor/generator MG to the odd-numbered shifting gears group. Therefore, the shock during engine starting may be minimized.

Figure 5:
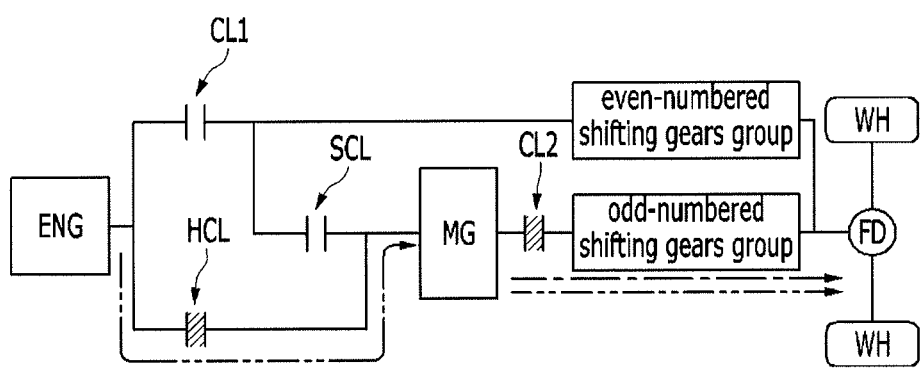
FIG. 5 is a circuit diagram in odd-numbered shifting in a hybrid-electric vehicle (HEV) mode of transmission system according to various embodiments of the present invention.
Figure 6:
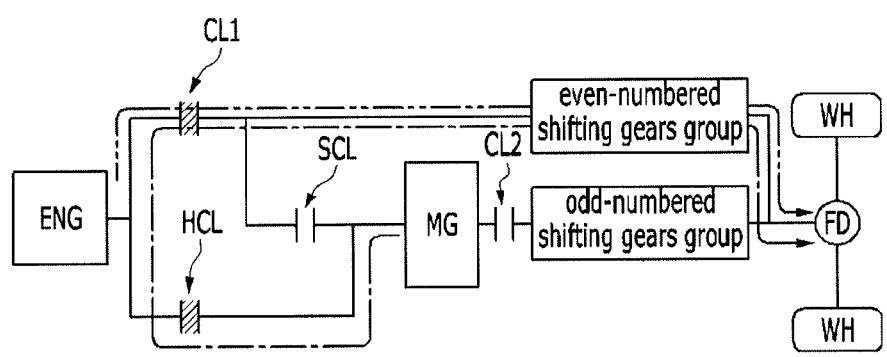
FIG. 6 is a circuit diagram in even-numbered shifting in a HEV mode of transmission system according to various embodiments of the present invention.

FIG. 5 and FIG. 6 are circuit diagrams in HEV mode of transmission system according to various embodiments of the present invention, and FIG. 5 is a circuit diagram in odd-numbered shifting and FIG. 6 is a circuit diagram in even-numbered shifting.

Referring to FIG. 5, in the transmission system according to various embodiments of the present invention, the clutch for hybrid HCL is controlled in HEV mode.

Then, the engine ENG and the motor/generator MG are directly connected with each other. When odd-numbered shifting is done in this state, torque of the engine ENG and the motor/generator MG is combined to be delivered to the odd-numbered shifting gears group to be shifted through the second clutch CL2 and be output as multi-stage odd-numbered shifting gears (the first, third, fifth, and seventh speeds) as in FIG. 5.

Further, when even-numbered shifting is done, torque of the engine ENG and the motor/generator MG is combined to be delivered to the even-numbered shifting gears group to be shifted through the first clutch CL1 and be output as multi-stage even-numbered shifting gears (the second, fourth, sixth, and eighth speeds) as in FIG. 6.

Accordingly, same shifting may be done as conventional DCT if the first clutch CL1 and the second clutch CL2 is alternatively operated and shifting is done according to shifting gears in a state of controlling the clutch for hybrid HCL during HEV mode driving.

As describe above, in the transmission system of hybrid electric vehicle according to various embodiments of the present invention, multi-stage shifting same as DCT is done, and EV, HEV, and regenerative braking mode driving are possible by operation of the motor/generator, the clutch for hybrid and the clutch for engine starting.

Further, multi-range shifting gears are realized by torque of the motor/generator in EV mode, even-numbered shifting gears are realized by torque of the engine in HEV mode, and odd-numbered shifting gears are realized by torque of the motor/generator to improve fuel consumption.

Further, shock may be minimized according to engine starting during driving since shock generated when torque of the motor/generator is delivered to the engine through the clutch for engine starting and engine starting is conducted during driving is absorbed by slip of the second clutch.

Further, disconnection of torque may not occur during even-numbered stage shifting by torque of the engine since multi-stage odd-numbered shifting is done in EV mode.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A power transmission system of hybrid electric vehicle, comprising:
   an engine;
   a motor/generator disposed on an opposite side of a same axis of the engine;
   an input unit including a first input shaft having a first end portion directly connected to the engine, a second input shaft separately disposed on a same axis as the first input shaft and axially spaced from the first input shaft, wherein a first end portion of the second input shaft is selectively connectable with a second end portion of the first input shaft and a second end portion of the second input shaft is directly connected with an output side of the motor/generator, a first middle shaft comprising a hollow shaft and disposed surrounding the first input shaft without rotational interference with the first input shaft to be selectively connectable with the first input shaft such that at least one input gear is disposed on an outside surface of the first middle shaft, and a second middle shaft including a hollow shaft and disposed surrounding the second input shaft without rotational interference with the second input shaft to be selectively connectable with the second input shaft such that at least one input gear is disposed on an outside surface of the second middle shaft; and
   an output shifter shifting torque of the input unit and outputting the shifted torque.

2. The system of claim 1, wherein the motor/generator includes a rotor connected with the second input shaft and a stator disposed on an outside of the rotor and fixed to a transmission housing.

3. The system of claim 1, wherein the first input shaft and the second input shaft are selectively connectable to each other through a clutch for hybrid.

4. The system of claim 1, wherein
   at least one input gear disposed on the first middle shaft includes a first input gear and a second input gear;
   the first input gear operating as an input gear of first speed and eighth speed and the second input gear operating as an input gear of second speed and fourth speed are sequentially disposed from the engine to the motor/generator; and
   at least one input gear disposed on the second middle shaft includes a third input gear and a fourth input gear, the third input gear operating as an input gear of the first speed and third speed and the fourth input gear operating as an input gear of fifth speed and seventh speed are sequentially disposed from the motor/generator to the engine.

5. The system of claim 4, wherein the output shifter includes:
   a first shifting output device including four shifting gears selectively and synchronously connected with the first shaft by selective operation of first and second synchronizers disposed on the first shaft disposed in parallel with the first and second middle shafts to output torque as four speed ratios;
   a second shifting output device including four shifting gears selectively and synchronously connected with the second shaft by selective operation of third and fourth synchronizers disposed on the second shaft disposed in parallel with the first and second middle shafts to output torque as four speed ratios; and
   a clutch for engine starting, selectively connectable with one shifting gear of the second input shaft and the shifting gear of first and second shifting output devices to deliver torque of the second input shaft to the first middle shaft.

6. The shaft of claim 5, wherein the first synchronizer selectively and synchronously connects a first speed shifting gear engaged with the third input gear and a fifth speed shifting gear engaged with the fourth input gear with the first output shaft.

7. The system of claim 5, wherein the second synchronizer selectively and synchronously connects a second speed shifting gear engaged with the second input gear and a sixth speed shifting gear engaged with the first input gear with the first output shaft.

8. The system of claim 5, wherein the third synchronizer selectively and synchronously connects a third speed shifting gear engaged with the third input gear and a seventh speed shifting gear engaged with the fourth input gear with the second output shaft.

9. The system of claim 5, wherein the fourth synchronizer selectively and synchronously connects a fourth speed shifting gear engaged with the second input gear and an eighth speed shifting gear engaged with the first input gear with the second output shaft.

10. The system of claim 9, wherein the clutch for engine starting selectively connects a third middle shaft with the fourth shifting gear, and the third middle shaft is integrally formed with a passive gear for engine starting engaged with a drive gear for the engine starting including a hollow shaft and disposed on the second output shaft of a first side of the fourth speed shifting gear without rotational interference to be disposed on the second input shaft.

11. The system of claim 1, wherein the output shifter includes:
   first and second output shafts in parallel with the first and second middle shafts; and
   a plurality of shifting gears disposed on the first and second output shafts in a state of being engaged with the input gears on the first and second middle shafts to be selectively and synchronously connected with the first or second output shafts by respective synchronizers.

* * * * *